United States Patent [19]

Rothman

[11] Patent Number: 4,788,114
[45] Date of Patent: Nov. 29, 1988

[54] ELECTRODE AND ELECTROCHEMICAL CELL

[75] Inventor: Ulf S. E. Rothman, Skanör, Sweden

[73] Assignee: Inclusion AB, Malmo, Sweden

[21] Appl. No.: 49,108

[22] PCT Filed: Aug. 29, 1986

[86] PCT No.: PCT/SE86/00384

§ 371 Date: Apr. 29, 1987

§ 102(e) Date: Apr. 29, 1987

[87] PCT Pub. No.: WO87/01516

PCT Pub. Date: Mar. 12, 1987

[30] Foreign Application Priority Data

Aug. 30, 1985 [SE] Sweden .................................. 8504036

[51] Int. Cl.$^4$ ........................ H01M 4/62; H01M 4/72
[52] U.S. Cl. ................................... 429/217; 429/140; 429/234; 429/245
[58] Field of Search ................. 429/140, 217, 234, 245

[56] References Cited

U.S. PATENT DOCUMENTS

| | | | |
|---|---|---|---|
| 3,011,007 | 11/1961 | Evers et al. | 429/140 |
| 3,647,557 | 3/1972 | Kegelman | 429/86 |
| 3,920,479 | 11/1975 | Westberg et al. | 429/234 |
| 4,310,607 | 1/1982 | Shay | 429/104 |

Primary Examiner—Brian E. Hearn
Assistant Examiner—Stephen J. Kalafut
Attorney, Agent, or Firm—Merchant, Gould, Smith, Edell, Welter & Schmidt

[57] ABSTRACT

In an electrode for an electrochemical cell, the solid active electrode material is accomodated in a plurality of electrolyte-permeable hollow fibres, preferably of yieldable plastic.

An electrochemical cell comprises at least one such electrode.

7 Claims, 1 Drawing Sheet

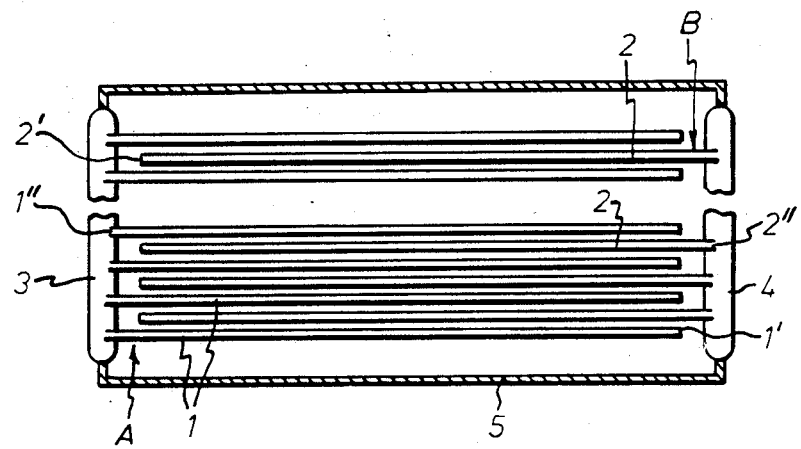

ELECTRODE AND ELECTROCHEMICAL CELL

The present invention relates to an electrode for an electrochemical cell and to such a cell having at least one such electrode.

As is well known in connection with electrochemical cells, the power of the cell increases with an increase in the contact surface between the electrolyte and the electrode. One step towards such a power increase has been the development of particulate active materials (paste), e.g. in lead-acid cells. In e.g. plate electrodes, the contact surface of the compact frame and current collector supporting the active material has been increased by means of grooves provided therein for such power-increasing purposes. Such electrodes provided with a compact frame are necessarily heavy. It has been possible to reduce the weight by using a grid or expanded mesh as carrier for the active material and as current collector. However, also such a grid will considerably add to the weight of the cell. Further, such plate electrodes require special separators and have a tendency to crumble, i.e. release particles of active material. This has been counteracted by designing the electrode separator as a pocket for the electrode plate. In so-called tubular electrodes, the active material is contained in macroporous tubes or hoses of e.g. braided glass or synthetic fibres, cf. e.g. U.S. patent application No. 4,537,842.

Such tubes or hoses can be manufactured with an inner diameter of only down to about 4 mm. Further, by the macroporosity of the hoses, portions of enclosed active material may leave the hose especially when the active material is swelling during charge/discharge. Also, the hoses often burst during such swelling.

According to the invention, the solid active electrode material is enclosed in hollow fibres which have microporous peripheral walls permeable to electrolyte (ions) and which both support the active material and serve as electrode separator. Several thousands of such hollow fibres may exist in one electrode. Suitable hollow fibres consist of thermoplastic and are known from the ultrafiltration technique. Such plastic hollow fibres have the advantage of being light and elastic or at least yieldable, which means that the fibres can yield to the swelling of active material and be formed into any desired configuration. If the hollow fibre material is elastic, this affords the advantage that the hollow fibre follows any volumetric variation of the active material during charge/discharge and, in this manner, holds the particles in the active material together.

The invention is applicable to both negative and positive electrodes with solid active electrode material and to all types of electrochemical cells operating at moderate temperatures, both primary and secondary cells, such as lithium, lead-acid and alkaline nickel cells. The hollow fibre material is so selected that it is resistant to the electrolyte (e.g. polysulfone for acid electrolyte and polyamide for alkaline electrolyte). The other characteristics of the hollow fibres, such as inner diameter, wall thickness, pore diameter and porosity, can easily be adapted by the expert to the active material to be enclosed in the hollow fibres and to the reaction environment in the cell. It is contemplated that the diameter suitably is <3 mm, the wall thickness suitably <300 $\mu$m, the pore diameter <20 $\mu$m, and the porosity >50%. The hollow fibres may have a cross-sectional shape other than circular.

One embodiment of the invention will now be described in greater detail with reference to the accompanying principle drawing. This embodiment relates to a lead-acid cell.

One electrode comprises a bundle A of a plurality of hollow fibres 1 filled with lead dioxide powder. Another electrode comprises another bundle B of a plurality of elastic hollow fibres 2 which are permeable to electrolyte (sulfuric acid) and filled with spongy lead. One end 1' of the hollow fibres 1 is sealed, like one end 2' of the fibres 2. The bundles A and B are so assembled that their hollow fibres engage in between each other with the ends 1' and 2' facing away from each other. The other ends 1" and 2" of the hollow fibres 1 and 2, respectively, are interconnected, respectively, by means of a lead body 3 and 4 in electrically conducting contact with the active material (lead dioxide and spongy lead) in the hollow fibres 1, 2 of the respective bundle. The bodies 3 and 4 form the poles of a cell which is completed by a vessel 5 containing sulfuric acid. The vessel is sealed around the poles in a suitable manner. In this example, the hollow fibres 1 and 2 are commercially available, acid-proof polysulfone hollow fibres of ultrafiltration grade with a diameter of 200 $\mu$m and a wall thickness of 40 $\mu$m.

The filling of the hollow fibres in the electrode with active material can be so carried out that a slurry of active material or precursor therefor is pressed by means of a pump into the hollow fibres assembled into a bundle, through first, open ends thereof. The opposite ends of the hollow fibres are closed at this stage, e.g. by fusing. The fibre lumina are then graudally filled with active material while the slurry liquid will leave through the pores of the fibres. After the fibre lumina have been filled with active material, the open end of the bundle is dipped in molten lead to form a pole. Alternatively, the pole may consist of a bus-bar which is connected to thin metal wires (current collector) each inserted in a hollow fibre. Titanium wires are here mentioned as an option for a lead-acid cell.

In the drawing, the hollow fibres 1 of the bundle A are disposed so as to alternate with the hollow fibres 2 of the bundle B, this being of course not an absolute requirement. Because of the plurality of hollow fibres in the bundles A and B, such accuracy for assembling the bundles A and B is not necessary.

I claim:

1. An electrode structure for an electrochemical cell, said electrode structure comprising:
   (a) a plurality of microporous hollow fibres formed of a substantially non-conductive material permeable to electrolyte; each of said fibres having: a diameter of less than 3 millimeters; a wall thickness of less than 300 micrometers; and, a pore diameter of less than 20 microns; and,
   (b) solid active electrode material contained within said hollow fibres.

2. An electrode structure according to claim 1 wherein the fibres are packed in a bundle.

3. An electode structure according to claim 1 wherein the fibres are plastic.

4. An electrode structure according to claim 1 wherein the fibres are elastic.

5. An electrochemical cell including at least one electrode structure comprising:
   (a) a plurality of microporous hollow fibres formed of a substantially non-conductive material permeable to electrolyte; each of said fibres having: a diateter of less than 3 millimeters; a wall thickness of less than 300 micrometers; and, a pore diameter of less than 20 microns; and (b) solid active electrode material contained within said hollow fibres.

6. An electrochemical cell according to claim 5 wherein said cell comprises lead-acid cell.

7. An electrochemical cell including:
(a) a first electrode structure comprising:
  (i) a plurality of microporous hollow fibres formed of a substantially non-conductive material permeable to electrolyte; each of said fibres having: a diameter of less than 3 millimeters; a wall thickness of less than 300 micrometers; and, a pore diameter of less than 20 microns; and,
  (ii) solid active electrode material contained within said hollow fibres;
(b) a second electrode structure comprising:
  (i) a plurality of microporous hollow fibres formed of a substantially non-conductive material permeable to electrolyte; each of said fibres having: a diameter of less than 3 millimeters; and, a pore diameter of less than 20 microns; and,
  (ii) solid active electrode material contained within said holow fibres;
(c) said fibres of said first and second electrode structure being oriented such that first electrode structure fibres are generally oriented adjacent second electrode structure fibres; and, second electrode structure fibres are generally oriented adjacent first electrode structure fibres.

* * * * *